United States Patent
Lee et al.

[11] Patent Number: 5,968,355
[45] Date of Patent: *Oct. 19, 1999

[54] APPARATUS FOR ASEPTIC VORTEX FLOW CONCENTRATION

[75] Inventors: Richard Lee, Santa Clara; Daniel Prows, Los Gatos; Louis Fries, Los Alto, all of Calif.

[73] Assignee: Matrix Pharmaceutical, Inc., Fremont, Calif.

[ * ] Notice: This patent is subject to a terminal disclaimer.

[21] Appl. No.: 09/197,528

[22] Filed: Nov. 23, 1998

Related U.S. Application Data

[63] Continuation of application No. 08/742,058, Oct. 31, 1996.

[51] Int. Cl.⁶ .............. B01D 21/26; B01D 63/00
[52] U.S. Cl. .................. 210/321.68; 210/321.67; 210/360.2; 210/435; 422/72; 422/101; 436/177; 436/178
[58] Field of Search ............ 210/321.67, 321.68, 210/360.2, 435; 422/72, 101; 436/177, 178

[56] References Cited

U.S. PATENT DOCUMENTS

| | | |
|---|---|---|
| 3,464,554 | 9/1969 | Laut . |
| 4,015,187 | 3/1977 | Chmiel . |
| 4,249,397 | 2/1981 | Guerra ........................................ 64/29 |
| 4,279,115 | 7/1981 | Roberts et al. ............................ 53/314 |
| 4,559,760 | 12/1985 | Daniels et al. ............................ 53/314 |
| 4,658,565 | 4/1987 | Westbrook et al. ....................... 53/308 |
| 4,662,153 | 5/1987 | Wozniak ................................. 53/331.5 |
| 4,790,942 | 12/1988 | Shmidt et al. ............................ 210/650 |
| 4,867,878 | 9/1989 | Rashev .................................... 210/363 |
| 4,876,013 | 10/1989 | Shmidt et al. ............................ 210/650 |
| 4,894,441 | 1/1990 | Menicagli . |
| 4,906,379 | 3/1990 | Hodgins et al. ......................... 210/638 |
| 4,911,847 | 3/1990 | Shmidt et al. ............................ 210/650 |
| 5,000,848 | 3/1991 | Hodgins et al. ..................... 210/321.68 |
| 5,054,260 | 10/1991 | Herzog ..................................... 53/307 |
| 5,143,630 | 9/1992 | Rolchigo et al. ........................ 210/780 |
| 5,186,824 | 2/1993 | Anderson et al. . |
| 5,254,250 | 10/1993 | Rolchigo et al. .................. 210/321.67 |
| 5,284,001 | 2/1994 | Ochs ......................................... 53/307 |
| 5,380,435 | 1/1995 | Stokes et al. . |
| 5,423,159 | 6/1995 | Bankuty et al. .................... 53/331.5 X |

OTHER PUBLICATIONS

Guideline on Sterile Drug Products Produced by Aseptic Processing, prepared by the Center for Drugs and Biologics and the Office of Regulatory Affairs, Food and Drug Administration (Jun. 1987).
*Benchmark® Rotary Biofiltration System* pamphlet, published by Membrex, Inc. (Aug. 1989).
*Pacesetter Notes: Steam Sterilization of the Pacesetter Vortex Flow Filtration System* pamphlet, published by Membrex, Inc.
*SteelPore: Stainless Steel Membranes for VFF Systems* pamphlet, published by Membrex, Inc.
Vortex Flow Perfusion, product literature published by Membrex, Inc.
Rulon®641, product literature published by Furon Dixon, Jul. 1990.
Rulon®641, data sheet, published by Furon Advanced Polymers Division.

*Primary Examiner*—David A. Reifsnyder
*Attorney, Agent, or Firm*—Burns, Doane, Swecker & Mathis LLP

[57] ABSTRACT

An apparatus is provided having a rotor inside a membrane for the aseptic vortex flow concentration of a liquid or semisolid dispersion which has a shed-resistant bearing interface so that unwanted bearing material does not contaminate the substances, e.g., pharmaceutical and biological materials, that are being processed.

8 Claims, 2 Drawing Sheets

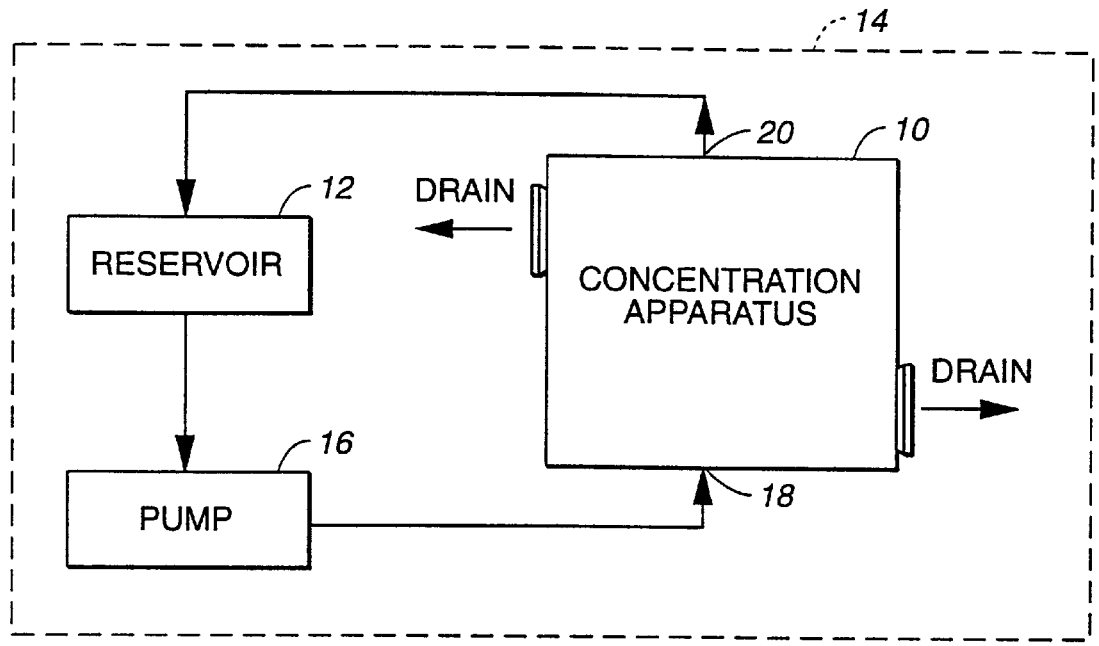
FIG._1
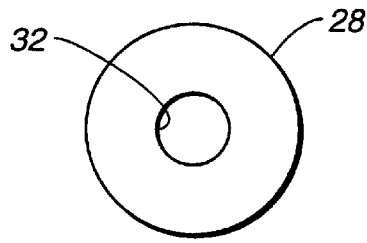
FIG._3
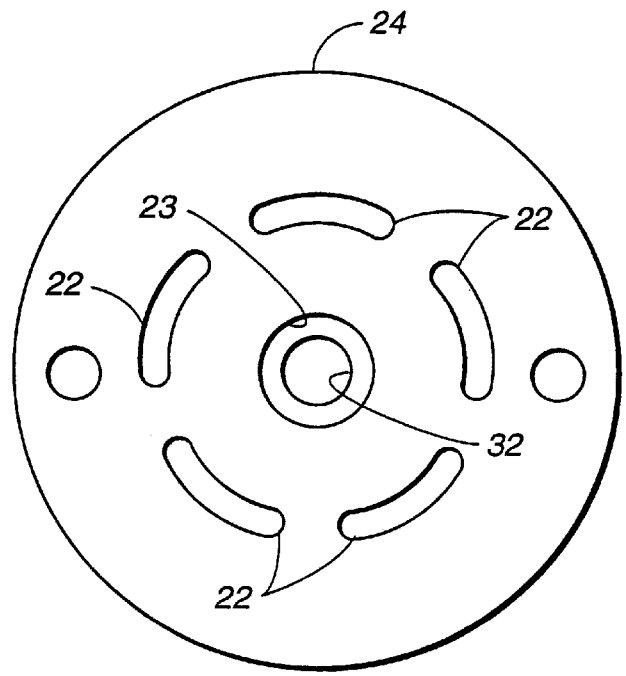
FIG._5
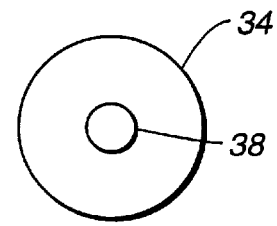
FIG._4

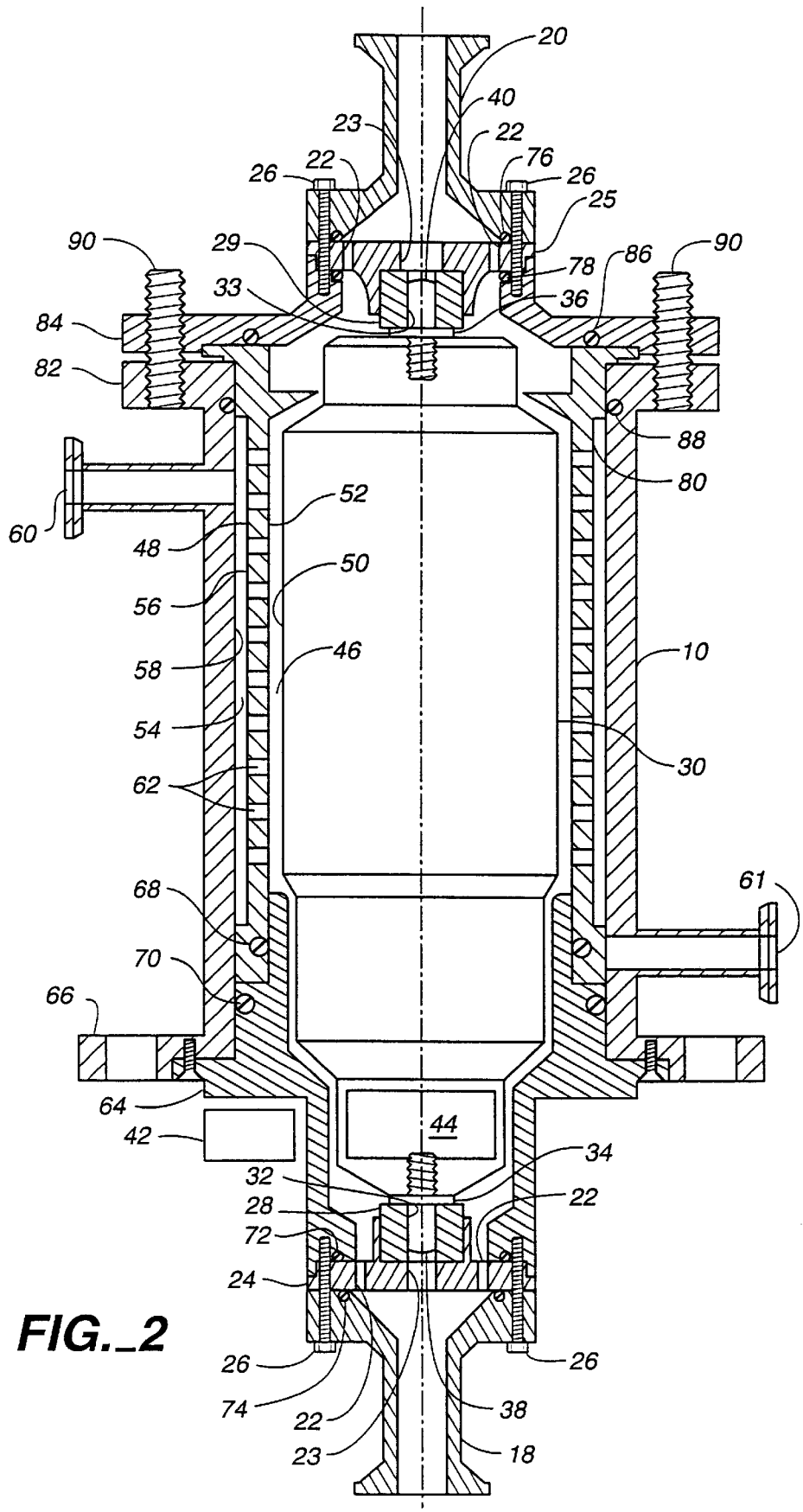
FIG._2

APPARATUS FOR ASEPTIC VORTEX FLOW CONCENTRATION

This application is a continuation, of application Ser. No. 08/742,058, filed Oct. 31, 1996 now allowed.

FIELD OF THE INVENTION

The invention relates generally to the aseptic processing of pharmaceutical and biological materials (e.g., gels), more particularly to a bearing system for a vortex flow concentration/filtration apparatus. More specifically, the present invention is directed to providing bearing surfaces in the concentration/filtration apparatus that do not shed or leave unwanted particles in the pharmaceutical or biological material being processed.

BACKGROUND OF THE INVENTION

In preparing pharmaceutical and biological materials for parenteral use, the material must be sterile and often must be concentrated. One method of concentrating these materials is by centrifugation. For viscous gels, centrifugation has associated problems of product recovery, aseptic operation and the maintenance of a closed system. Another method includes filtration. In conventional dead-end filtration with a stationary filter medium or membrane the liquid mixture flows perpendicular to the filter media. In tangential flow filtration, the liquid mixture passes tangentially past the filter media and the filtrate (permeate) passes through the medium. In such filtration, separation only occurs at the liquid-media boundary (i.e., the boundary layer). The boundary layer tends to retain the filtered particles which are prevented from returning to the bulk solution. This leads to concentration polarization and in some cases to formation of gel layers on the filter media. Clogging or blinding of the filter media is a problem at any level of filtration, insofar as transmembrane flow (i.e., flux) drops as the pores in the filter media become clogged. To eliminate clogging and blinding, vortex flow filtration has been known to be used.

Vortex flow filtration devices typically employ a semipermeable membrane as the filtration media. The vortex flow filtration apparatus relies on certain components of the filtered material being much more permeable through the membrane than other components. The purpose of the vortex flow filtration apparatus is to separate one or more substances by retaining some on one side of a membrane as a "retentate" while passing others through the membrane as a "permeate". In the processing of pharmaceutical and biological materials, often the concentrated retentate is the valuable portion and the permeate is drained off.

Vortex flow filtration uses a known hydrodynamic phenomenon to prevent clogging or blinding of the filter media caused by the accumulation of dissolved or suspended material thereon. The operation of these systems is discussed in U.S. Pat. Nos. 4,790,942, 4,876,013, and 4,911,847 issued to Shmidt et al., which are incorporated herein by reference in their entirety.

In short, the vortex flow filtration device discussed in these references uses a membrane mounted on an inner body which rotates within a stationary outer body. The vortex flow apparatus prevents clogging by producing Taylor vortices in the parent fluid in the annular gap between the inner body and the stationary outer body. However, there is a need for a device that can effectively concentrate gels and/or semisolids, such as aqueous collagen dispersions, for parenteral use.

The known vortex flow filtration devices of the prior art are equipped with graphite bearings which are adequate for their intended purpose of separating cell culture or fermentation cells from the liquid content. These systems may be sterile but produce small levels of graphite particulates shed from the bearings, which is tolerable for separation purposes if the product produced is not intended for parenteral use.

Purified bovine collagen is used in a variety of medical devices including hemostats, sutures, corneal shields, and soft tissue augmentation. Collagen gels are often intermediates in the preparation of these devices and, in some cases, the gels represent the final medical products.

Sterile bovine collagen dispersions and gels with concentrations up to 10 % (w/w) and higher are commercially available. These formulations are prepared by conventional processes whereby collagen is precipitated from solution and aseptically concentrated. A concentration/separation technique commonly employed is centrifugation. Centrifugation may require high capital expenditure; and presents sterilization and validation challenges and has product recovery problems for viscous, adhesive materials. Other separation techniques have also been found to be unsatisfactory. For example, conventional dead end filtration and tangential flow filtration are not feasible because collagen fibers tend to clog or blind the filters.

Technical problems associated with concentrating collagen gels are attributable, in part, to their high viscosity and cohesive and adhesive properties. For example, aqueous collagen products having about 0.3% (wt) to about 11% (wt) solids have viscosities ranging from about 30 mPa·sec to about 40,000 mPa·sec.

There is a need to provide an effective means for aseptically concentrating pharmaceutical and biological materials, including collagen and other gels and semisolids. The present invention offers such an apparatus for aseptic filtration/concentration of pharmaceutical and biological materials (particularly semisolids and/or gels), such as aqueous dispersions of collagen.

SUMMARY OF THE INVENTION

The present invention provides an apparatus for vortex flow concentration of semisolids or gels which has a shed-resistant bearing interface so that undesirable particles do not shed off the bearing and discolor and/or contaminate the pharmaceutical or biological material being processed for parenteral use. The apparatus of the present invention is in response to the discovery that known vortex flow filtration systems having graphite bearings cannot be used to concentrate parenteral products because of the graphite particles that shed from the bearings. The present invention allows for the first time the use of vortex flow filtration to concentrate disperse compositions (e.g. dilute suspensions) into semisolids or gels for parenteral use.

In one embodiment of the present invention, there is provided an apparatus having a permeable or semi-permeable membrane for aseptic vortex flow concentration of a dispersion to result in a gel or semisolid. The apparatus comprises a rotatable body having an outer side wall, an upper spindle, and a lower spindle, an outer body having an upper end with openings therein, a lower end with openings therein, and an inner side wall spaced from the outer side wall of the rotatable body to define an annular space for receiving the permeable or semi-permeable membrane. There is also a shed-resistant upper spindle support in the upper end of the outer body for receiving the upper spindle and a shed-resistant lower spindle support in the lower end of the outer body for receiving the lower spindle. There is provided means for rotating the rotatable body about an axis through the upper spindle and the lower spindle at a rate sufficient to produce Taylor vortices in an annular gap between the outer side wall of the rotatable body and the permeable or semi-permeable membrane. The shed-resistant upper spindle support is located adjacent to the openings in the upper end and the shed-resistant lower spindle support is located adjacent to the openings in the lower end such that the dispersion passes through the openings and lubricates the shed-resistant upper spindle support and the shed-resistant lower spindle support.

In another embodiment of the present invention, there is provided an apparatus having a filter for aseptic vortex flow concentration of a dispersion to result in a gel or semi-solid. The apparatus comprises a housing having an upper end with an outlet therein, a lower end with an inlet therein and an inner side wall. An upper rotor support is located in the upper end of the housing and a lower rotor support is located in the lower end of the housing. There is a rotor with an upper shed-resistant member and a lower shed-resistant member rotatably received in the upper rotor support and the lower rotor support. The rotor has an outer side wall angularly spaced from the inner side wall of the housing to define an annular space for receiving the filter. There is provided means for rotating the rotor about an axis through the center of the rotor at a rate sufficient to produce Taylor vortices in an annular space between the outer side wall of the rotor and the filter. The upper rotor support is located adjacent to the outlet in the upper end and the lower rotor support is located adjacent to the inlet in the lower end such that the dispersion passes over the upper shed-resistant member and the lower shed-resistant member.

BRIEF DESCRIPTION OF THE DRAWINGS

Many objects and advantages of the present invention will be apparent to those of ordinary skill in the art when this specification is read in conjunction with the attached drawings wherein like reference numerals are applied to like elements and wherein:

FIG. 1 is a diagrammatical view of a system for aseptically filtering or concentrating a pharmaceutical or biological material in accordance with one embodiment of the present invention;

FIG. 2 is a sectional view of a vortex flow filtration/concentration apparatus in accordance with one embodiment of the present invention;

FIG. 3 is a top plan view of a spindle support in accordance with one embodiment of the present invention for use in the apparatus shown in FIG. 2;

FIG. 4 is a top plan view of a spindle in accordance with one embodiment of the present invention for use in the apparatus shown in FIG. 2; and FIG. 5 is a top plan view of a bearing support in accordance with one embodiment of the present invention for use in the apparatus shown in FIG. 2.

DETAILED DESCRIPTION OF THE PREFERRED EMBODIMENTS

The present invention will be described in detail below, but first a few terms will be defined.

Definitions:

GEL—refers to colloids in which a dispersed solid or polymeric phase has combined with a continuous phase to produce a viscous product.

SHED-RESISTANT—refers to materials which do not produce particulates to the extent that product in contact with those materials is contaminated with those particulates. Acceptable levels of particulate matter in injections is discussed in USP XXIII <788>. Examples of shed-resistant materials include but are not limited to materials which will operate in continuous non-lubricated service with less than 500 micro inches of wear at 10,000 PV for 40 hours where $$PV=\text{speed (ft/min)}\times\text{load (psi)}$$

and the mating surface is 316 stainless steel; continuous non-lubricated service with less than 400 micro inches of wear at 10,000 PV for 40 hours where the mating surface is 1018 stainless steel; and/or continuous non-lubricated service with less than 350 micro inches of wear at 10,000 PV for 40 hours where the mating surface is 303 stainless steel.

In addition, or as an alternative, to the requirements just discussed, the following procedure can be conducted to determine if the material is sufficiently shed-resistant.

Clean, pure, particulate free water or product is recycled through the thoroughly cleaned system for the maximum proposed run time. The water is then tested for particulates according to USP XXIII<788>.

Also see the procedures described in USP XXIII, <788> "Particulate Matter in Injections" which is incorporated herein by reference in its entirety.

Three tests are applied in U.S.P. XXIII, <88> to the materials: the Systemic Injection Test, Intracutaneous Test, and Implantation Test. These three tests are reproduced below directly from U.S.P. XXIII, <88>. For purposes of these tests, these definitions apply. The "sample" is the specimen under test or an extract prepared from such a specimen. A "blank" consists of the same quantity of the same extracting medium that is used for the extraction of the specimen under test, treated in the same manner as the extracting medium containing the specimen under test. A "negative control" is a specimen that gives no reaction under the conditions of the test. Materials are classified on the basis of the response criteria prescribed in the following Table 1.

TABLE 1

Classification of Plastics.

| Plastic Classes[a] | | | | | | | | Tests To Be Conducted | |
|---|---|---|---|---|---|---|---|---|---|
| I | II | III | IV | V | VI | Test Material | Animal | Dose | Procedure |
| | | | | | | Extract of Sample in | Mouse | 50 mL/kg | A (iv) |
| x | x | x | x | x | x | Sodium Chloride | Rabbit | 0.2 mL/animal | B |
| x | x | x | x | x | x | Injection | | at each of | |
| | | | | | | | | 10 sites | |
| | x | x | x | x | x | Extract of Sample in | Mouse | 50 mL/kg | A (iv) |

TABLE 1-continued

Classification of Plastics.

| Plastic Classes[a] | | | | | | Test Material | Animal | Dose | Procedure |
|---|---|---|---|---|---|---|---|---|---|
| I | II | III | IV | V | VI | | | | |
| | x | x | x | x | x | 1 in 20 Solution of Alcohol in Sodium Chloride Injection | Rabbit | 0.2 mL/animal at each of 10 sites | B |
| | | x | | x | x | Extract of Sample in Polyethylene Glycol 400 | Mouse | 10 g/Kg | A (ip) |
| | | | | x | x | | Rabbit | 0.2 mL/animal at each of 10 sites | B |
| | | x | x | x | x | Extract of Sample in Vegetable Oil | Mouse | 50 g/Kg | A (ip) |
| | | | x | x | x | | Rabbit | 0.2 mL/animal at each of 10 sites | B |
| | | | x | | x | Implant strips of Sample | Rabbit | 4 strips/animal | C |

[a]Tests required for each class are indicated by "x" in appropriate columns.
[b]Legend: A (ip) - Systemic Injection Test (intraperitoneal); A (iv) - Systemic Injection Test (intravenous); B - Intracutaneous test (intracutaneous); C - Implantation Test (intramuscular implantation).

Apparatus—The apparatus for the tests includes the following:

AUTOCLAVE—Use an autoclave capable of maintaining a temperature of 121±2.0° equipped with a thermometer, a pressure gauge, a vent cock, a rack adequate to accommodate the test containers above the water level, and a water cooling system that will allow for cooling of the test containers to about, but not below, 20° immediately following the heating cycle.

OVEN—Use an oven, preferably a forced-circulation model, that will maintain operating temperatures of 50 or 70° within ±20.

EXTRACTION CONTAINERS—Use only containers, such as ampoules or screw-cap culture test tubes, of Type I glass. If used, culture tests tubes are closed with screw caps having suitable elastomeric liners. The exposed surface of the elastomeric liner is completely protected with an inert solid disk 0.05 mm to 0.075 mm in thickness. A suitable disk may be fabricated from a polytef resin.

Preparation of Apparatus—Cleanse all glassware thoroughly with chromic acid cleansing mixture, or if necessary with hot nitric acid, followed by prolonged rinsing with water. Clean cutting utensils by an appropriate method (e.g., successive cleaning with acetone and methylene chloride) prior to use in subdividing a specimen. Clean all other equipment by thorough scrubbing with a suitable detergent and prolonged rinsing with water.

Render containers and equipment used for extraction, and in transfer and administration of test material, sterile and dry by a suitable process. [Note-If ethylene oxide is used as the sterilizing agent, allow adequate time for complete degassing.]

Extracting Media—SODIUM CHLORIDE INJECTION. Use Sodium chloride Injection containing 0.9% of Sodium Chloride NaCL.

1 in 20 Solution of Alcohol in Sodium Chloride Injection.
Polyethylene Glycol 400.
Vegetable Oil—Use freshly refined Sesame Oil or Cottonseed Oil or other suitable vegetable oils.
Drug Product Vehicle (where applicable).
Water For Injection.

[Note—The Sesame Oil or Cottonseed Oil or other suitable vegetable oil meets the following additional requirements. Obtain, if possible, freshly refined oil. Use three properly prepared animals and inject the oil intracutaneously in a dose of 0.2 mL into each of 10 sites per animal, and observe the animals at 24, 48, and 72 hours following injection. Rate the observations at each site on the numerical scale indicated in Table 5. For the 3 rabbits (30 injection sites), at any observation time, the average response for erythema is not greater than 0.5 and for edema is not greater than 1.0 and no site shows a tissue reaction larger than 10 mm in overall diameter. The residue of oil at the injection site should not be misinterpreted as edema. Edematous tissue blanches when gentle pressure is applied.]

Procedure—Preparation of Sample—Both the Systemic Injection Test and the Intracutaneous Test may be performed using the same extract, if desired. or separate extracts may be made for each test. Select and subdivide into portions a Sample of the size indicated in Table 2. Remove particulate matter, such as lint and free particles by treating each subdivided Sample or Negative Control as follows: place the Sample into a clean, glass-stoppered 100-mL graduated cylinder of Type I glass, and add about 70 mL of Water for Injection. Agitate for about 30 seconds, and drain off the water, repeat this step, and dry those pieces prepared for the extraction with Vegetable Oil in an oven at a temperature not exceeding 50°. [Note—Do not clean the Sample with a dry or wet cloth or by rinsing or washing with an organic solvent surfactant, etc.]

TABLE 2

Surface Area of Specimen To Be Used[1]

| Form of Material | Thickness | Amount of Sample for Each 20 mL of Extracting Medium | Subdivided Into |
|---|---|---|---|
| Film or sheet | <0.5 mm | Equivalent of 120 cm² total surface area (both sides combined) | Strips of about 5 × 0.3 cm |
| | 0.5 to 1 mm | Equivalent of 60 cm² total surface area (both sides combined | |
| Tubing | <0.5 mm (wall) | Length (in cm) = 120 cm²/(sum of ID and OD circumferences) | Sections of about 5 × 0.3 cm |
| | 0.5 to 1 mm | Length (in cm) = 60 | |

TABLE 2-continued

Surface Area of Specimen To Be Used[1]

| Form of Material | Thickness | Amount of Sample for Each 20 mL of Extracting Medium | Subdivided Into |
|---|---|---|---|
| | (wall) | $cm^2$/(sum of ID and OD circumferences) | |
| Slabs, tubing, and molded items | >1 mm | Equivalent of 60 $cm^2$ total surface area (all exposed surfaces combined) | Pieces up to about 5 × 0.3 cm |
| Elastomers | >1 mm | Equivalent of 25 $cm^2$ total surface area (all exposed surfaces combined) | Do not subdivide[2] |

[1]When surface area cannot be determined due to the configuration of the specimen, use 0.1 g of elastomer or 0.2 g of plastic or polymers for every 1 mL of extracting fluid.
[2]Molded elastomeric closures are tested intact.

Preparation of Extracts—Place properly prepared Sample to be tested in an extraction container, and add 20 mL of the appropriate extracting medium. Repeat these directions for each extracting medium required for testing. Also prepare one 20-mL blank of each medium for parallel injections and comparisons. Extract by heating in an autoclave at 121° for 60 minutes, in an oven at 70° for 24 hours, or at 50° for 72 hours. Allow adequate time for the liquid within the container to reach the extraction temperature.

Note—The extraction conditions should not in any instance cause physical changes such as fusion or melting of the Sample pieces, which result in a decrease in the available surface area. A slight adherence of the pieces can be tolerated. Always add the cleaned pieces individually to the extracting medium. If culture tubes are used for autoclave extractions with Vegetable Oil, seal screw caps adequately with pressure-sensitive tape.

Cool to about room temperature but not below 20°, shake vigorously for several minutes and decant each extract immediately, using aseptic precautions into a dry, sterile vessel. Store the extracts at a temperature between 20° and 30°, and do not use for tests after 24 hours. Of importance are the contact of the extracting medium with the available surface area of the plastic and the time and temperature during extraction, the proper cooling, agitation, and decanting process, and the aseptic handling and storage of the extracts following extraction.

Systemic Injection Test

This test is designed to evaluate systemic responses to the extracts of materials under test following injection into mice.

Test Animal—Use healthy, not previously used albino mice weighing between 17 and 23 grams. For each test group use only mice of the same source. Allow water and food, commonly used for laboratory animals and of known composition, ad libitum.

Procedure—[Note: Agitate each extract vigorously prior to withdrawal of injection doses to ensure even distribution of the extracted matter. However, visible particulates should not be injected intravenously.] Inject each of the five mice in a test group with the Sample or the Blank as outlined in Table 3, except to dilute each gram of the extract of the Sample prepared with polyethylene Glycol 400, and the corresponding blank, with 4.1 volumes of Sodium Chloride Injection to obtain a solution having a concentration of about 200 mg of polyethylene glycol per mL.

Observe the animals immediately after injection, again 4 hours after injection, and then at least at 24, 48, and 72 hours. If during the observation period none of the animals treated with the extract of the Sample shows a significantly greater biological reactivity than the animals treated with the Blank, the Sample meets the requirements of this test. If two or more mice die, or if abnormal behavior such as convulsions or prostration occurs in two or more mice, or if a body weight loss greater than 2 grams occurs in three or more mice, the Sample does not meet the requirements of the test. If any animals treated with the Sample show only slight signs of biological reactivity, and not more than one animal shows gross symptoms of biological reactivity or dies, repeat the test using groups of 10 mice. On the repeat test, all 10 animals treated with the Sample show no significant biological reactivity above the Blank animals during the observation period.

TABLE 3

Injection Procedure-Systemic Injection Test.

| Extract or Blank | Dose per kg | Route* | Injection Rate, μL per second |
|---|---|---|---|
| Sodium Chloride Injection | 50 mL | IV | 100 |
| 1 in 20 solution of Alcohol in Sodium Chloride Injection | 50 mL | IV | 100 |
| Polyethylene Glycol 400 | 10 g | IP | — |
| Drug product vehicle (where applicable) | 50 ml | IV | 100 |
| | 50 mL | IP | — |
| Vegetable Oil | 50 mL | IP | — |

*IV = intravenous (aqueous sample and blank); IP = intra-peritoneal (oleaginous sample and blank).

Intracutaneous Test

This test is designed to evaluate local responses to the extracts of material under test following intracutaneous injection into rabbits.

Test Animal—Select healthy, thin-skinned albino rabbits whose fur can be clipped closely and whose skin is free from mechanical irritation or trauma. In handling the animals, avoid touching the injection sites during observation periods, except to discriminate between edema and an oil residue. [Note—Rabbits previously used in unrelated tests and that have received the prescribed rest period, may be used for this test provided that they have clean, unblemished skin.]

Procedure—[Note—Agitate each extract vigorously prior to withdrawal of injection doses to ensure even distribution of the extracted matter.] On the day of the test, closely clip the fur on the animal's back on both sides of the spinal column over a sufficiently large test area. Avoid mechanical irritation and trauma. Remove loose hair by means of vacuum. If necessary, swab the skin lightly with diluted alcohol, and dry the skin prior to injection. More than one extract from a given material can be used per rabbit, if you have determined that the test result will not be affected. For each Sample use two animals and inject each intracutaneously, using one side of the animal for the Sample and the other side for the Blank as outlined in Table 4. [Note—Dilute each gram of the extract of the Sample prepared with Polyethylene Glycol 400, and the corresponding Blank, with 7.4 volumes of Sodium Chloride Injection to obtain a solution having a concentration of about 120 mg of polyethylene glycol per mL.]

Examine injection sites for evidence of any tissue reaction such as erythema, edema, and necrosis. Swab the skin lightly, if necessary, with diluted alcohol to facilitate reading of injection sites. Observe all animals at 24, 48, and 72 hours after injection. Rate the observations on a numerical scale for the extract of the Sample and for the Blank using Table 5. Reclip the fur as necessary during the observation period. The average erythema and edema scores for Sample and Blank sites are determined at every scoring interval (24, 48, and 72 hours) for each rabbit. After the 72 hour scoring, all erythema scores plus edema scores are totaled separately for each Sample and Blank. Divide each of the totals by 12 (2 animal×3 scoring periods×2 scoring categories) to determine the overall mean score for each Sample versus each corresponding Blank. The requirements of the test are met if the difference between the Sample and the Blank mean score is 1.0 or less. If at any observation period the average reaction to the Sample is questionably greater than the average reaction to the Blank, repeat the test using three additional rabbits. The requirements of the test are met if the difference between the Sample and the Blank mean score is 1.0 or less.

TABLE 4

Intracutaneous Test.

| Extract or Blank | Number of Sites (per animal) | Dose μL per site |
| --- | --- | --- |
| Sample | 5 | 200 |
| Blank | 5 | 200 |

TABLE 5

Evaluation of Skin Reactions.

| | Score |
| --- | --- |
| Erythema and Eschar Formation | |
| No erythema | 0 |
| Very slight erythema (barely perceptible) | 1 |
| Well-defined erythema | 2 |
| Moderate to severe erythema | 3 |
| Severe erythema (beet-redness) to slight eschar formation (injuries in depth) | 4 |
| Edema Formation* | |
| No edema | 0 |
| Very slight edema (barely perceptible) | 1 |
| Slight edema (edges of area well defined by definite raising) | 2 |
| Moderate edema (raised approximately 1 mm) | 3 |
| Severe edema (raised more than 1 mm and extending beyond the area of exposure) | 4 |

* Excludes noninflammatory (mechanical) edema from the blank or extraction fluid.

Implantation Test

The implantation test is designed for the evaluation of plastic materials and other polymeric materials in direct contact with living tissue. Of importance are the proper preparation of the implant strips and their proper implantation under aseptic conditions. Prepare for implantation 8 strips of the Sample and 4 strips of U.S.P. Negative Control Plastic RS. Each strip should measure not less than 10×1 mm. The edges of the strips should be as smooth as possible to avoid additional mechanical trauma upon implantation. Strips of the specified minimum size are implanted by means of a hypodermic needle (15-to-19 gauge) with intravenous point and a sterile trocar. Use either presterilized needles into which the sterile plastic strips are aseptically inserted, or insert each clean strip into a needle, the cannula and hub of which are protected with an appropriate cover, and then subjected to the appropriate sterilization procedure. [Note— Allow for proper degassing if agents such as ethylene oxide are used.]

Test Animal—Select healthy, adult rabbits weighing not less than 2.5 kg, and whose paravertebral muscles are sufficiently large in size to allow for implantation of the test strips. Do not use any muscular tissue other than the paravertebral site. The animals must be anesthetized with a commonly used anesthetic agent to a degree deep enough to prevent muscular movements, such as twitching.

Procedure—Perform the test in a clean area. On the day of the test or up to 20 hours before testing, clip the fur of the animals on both sides of the spinal column. Remove loose hair by means of vacuum. Swab the skin lightly with diluted alcohol and dry the skin prior to injection.

Implant four strips of the Sample into the paravertebral muscle on one side of the spine of each of 2 rabbits, 2.5 to 5 cm from the midline and parallel to the spinal column, and about 2.5 cm apart from each other. In a similar fashion implant 2 strips of U.S.P. Negative Control Plastic RS in the opposite muscle of each animal. Insert a sterile stylet into the needle to hold the implant strip in the tissue while withdrawing the needle. If excessive bleeding is observed after implantation of a strip, place a duplicate strip at another site.

Keep the animals for a period of not less than 120 hours, and sacrifice them at the end of the observation period by administering an overdose of an anesthetic agent or other suitable agents. Allow sufficient time to elapse for the tissue to be cut without bleeding. Examine macroscopically the area of the tissue surrounding the center portion of each implant strip. Use a magnifying lens and auxiliary light source. Observe the Sample and Control implant sites for hemorrhage, necrosis, discolorations, and infections, and record the observations. Measure encapsulation, if present, by recording the width of the capsule (from the periphery of the space occupied by the implant Control or Sample to the periphery of the capsule) rounded to the nearest 0.1 mm. Score encapsulation according to Table 6.

Calculate the differences between average scores for the Sample and Control sites. The requirements of the test are met if the difference does not exceed 1.0 or if the difference between the Sample and Control mean scores for more than one of the four implant sites does not exceed 1 for any implanted animal.

TABLE 6

Evaluation of Encapsulation in the Implantation Test

| Capsule Width | Score |
| --- | --- |
| None | 0 |
| up to 0.5 mm | 1 |
| 0.6–1.0 mm | 2 |
| 1.1–2.0 mm | 3 |
| Greater than 2.0 mm | 4 |

CLASS VI MATERIAL—refers to materials classified as USP Class VI as defined in USP XXIII, <88> "Biological Reactivity Tests, In Vivo" which is incorporated herein by reference in its entirety.

Apparatus 10 of the present invention is particularly useful for the aseptic concentration of pharmaceutical and biological gels and excipients for parenteral use, in particular aqueous collagen gels and other protein dispersions. For collagen to be incorporated into parenteral pharmaceutical or biological formulations it must be sterile. Collagen gels are often intermediates in the preparation of parenteral pharmaceutical or biological formulations, or sometimes the final medical products themselves. Often after a bioburden reduction step, there is a need to precipitate and aseptically concentrate the collagen. Apparatus 10 can be used to concentrate collagen from 0.25% by weight suspensions to greater than 12% by weight gels. The apparatus concentrates collagen at a high flux rate through a membrane and with a low transmembrane pressure by utilizing a three-dimensional flow profile, known as Taylor flow or Taylor vortices, to keep the membrane surface from fouling, blinding, clogging, etc. Taylor, using a framework of linear theory and considering viscous fluids, found that when a certain Taylor's number was exceeded, axially circumferential vortices appear which rotate in alternately opposing directions.

Taylor determined that the minimum condition for the establishment of such vortices, defined as the Taylor number $(T_a)$, is $$T_a = \frac{\mu_i d}{\nu} \sqrt{\frac{d}{R_i}} \geq 41.3$$

where $\nu$ is the kinematic viscosity of the fluid, $\mu_i$ is the peripheral velocity of the inner rotating cylinder, $R_i$ is the radius of an inner rotating cylinder, and d is the dimension of the annular gap filled with fluid between the inner cylinder and a stationary outer cylinder.

Taylor and others determined that the vortices would persist in some cases at $T_a=400$ and in other cases up to $T_a=1700$, but that turbulence would ensue if the Reynolds number $(R_a)$ rose above about 1000. The Reynolds number is $$R_a = \frac{\omega(2d)}{\nu}$$

where ω is the axial velocity. Those skilled in hydrodynamics will appreciate that a time average velocity profile of fluid flow will generate a smooth curve, but an instantaneous velocity profile is very jagged. Thus, the Taylor vortices may be characterized as the main flow, but there will be a turbulent component and, as $T_a$ rises, this instantaneous turbulent velocity will ultimately become more important.

In one embodiment of the vortex flow concentrating device of the present invention, the outer stationary cylinder is a permeable or semi-permeable membrane. The axially circumferential vortices that rotate in alternately opposing directions are formed between the rotating cylinder and the inside wall of the membrane. The strength of the vortices is directly proportional to the rotation rate of the rotating cylinder causing the permeate flow to increase with rotor speed. Because there is a net axial velocity due to the feeding and removal of fluid into the device, the individual vortices assume what appears to be a helical shape and move from the inlet to the outlet of the device. The rotation of the individual vortices and the movement up the inside wall of the membrane continuously scours the inside of the membrane so that gels, particulates and colloids that would otherwise collect there are pulled back into the fluid. When the conditions for establishing the Taylor vortices are met, the filtration/concentration apparatus operates at very minimal transmembrane pressures (approximately less than 3 psi).

Apparatus 10 can be used in a sterile, closed loop system 14 such as shown in FIG. 1. System 14 is shown as one possible embodiment, other elements can be present such as a heat exchanger on the return to the reservoir to remove heat generated by the rotating cylinder and the pump, or system 14 can be a subsystem of a larger system. A pharmaceutical or biological formulation, such as an aqueous dispersion of collagen, is placed in reservoir 12. The aqueous collagen dispersion begins as a free flowing slurry with a concentration of approximately 0.25% and a viscosity of approximately 10 to 15 mPa·sec. The collagen dispersion is circulated through system 14 with pump 16. For example, pump 16 can be a low shear peristaltic pump or lobe pump. Pump 16 pushes the aqueous collagen into inlet 18. The aqueous collagen dispersion passes through apparatus 10 (as will be described in more detail later) and exits through outlet 20. Water and soluble components (permeate) pass through the semi-permeable membrane and are removed from one or both drains 60, 61. The collagen dispersion is then recirculated through system 14 with pump 16 until the desired concentration is achieved. A related co-pending application which further describes the closed loop system is Ser. No. 08/742,677, filed on Oct. 1, 1996, entitled "Aseptic Collagen Concentration Process" which application is incorporated herein in its entirety.

The apparatus of the present invention allows for the concentration of collagen suspensions over a continuum from about 0.25% to greater than 12% by weight. Collagen dispersions at or above 2% by weight concentration are essentially a semisolid or a gel. Typically, a 2% collagen dispersion will have a viscosity of approximately 1,000 mPa·sec or above. Through the novel features discussed below, the present invention is capable of producing concentrations of 12% or more by weight and processing semisolids or gels having a viscosity of approximately 35,000 mPa·sec or more. Therefore, the present invention provides an apparatus that is capable of concentrating gels and semisolids of a large variety of pharmaceutical and biological materials under sterile conditions. Apparatus 10 can be used to concentrate a thin slurry to produce a semisolid or to concentrate a gel or semisolid to produce a higher concentration semisolid.

To better understand the novel features of the present invention, apparatus 10 will now be described in greater detail with respect to FIG. 2. Pump 16 pushes the aqueous pharmaceutical or biological material, such as a collagen dispersion, into inlet 18. The pharmaceutical or biological material enters inlet 18 and flows through openings 22 and center opening 23 in lower support 24. Lower support 24 and inlet 18 are attached to apparatus 10 by fasteners 26. As will be recognized by one of ordinary skill in the art other fasteners can be used. Fasteners 26 are advantageous, however, because they are removable which allows for ease in cleaning and sterilization as well as repair of the inlet, apparatus, and support. Lower support 24 holds lower spindle support 28. Lower spindle support 28 has an opening 32 for receiving lower spindle 34 of rotatable body or rotor 30. Opening 32 also allows the material flowing through center opening 23 to flow over the lower spindle 34 to help lubricate the surfaces on the lower spindle support 28 and lower spindle 34. Similarly, at the other end of apparatus 10, support 25 holds upper spindle support 29. Upper spindle support 29 has an opening 33 for receiving upper spindle 36 of rotatable body 30. Upper spindle support 29 is the same as lower spindle support 28. Upper spindle 36 and lower spindle 34 can be threaded and epoxied into rotatable body 30, be integrally formed with the rotatable body or attached by other known means.

In one embodiment, lower spindle support 28 in FIG. 2 and 3 is a bushing. Lower spindle pin 38 and upper spindle pin 40 are highly polished hard chrome plated 316 stainless steel or some equivalent. The pins 38, 40 should be corrosion resistant, smooth and have a very hard surface (e.g., having a hardness $R_c$, as measured by the Rockwell method, of greater than 60). Other materials include, but are not limited to, titanium nitride (TiN) coated titanium or TiN coated stainless steel. Lower spindle support 28 and upper spindle support 29 are constructed of a shed-resistant material. Preferably, the shed-resistant material has other characteristics such as remaining dimensionally stable after steam sterilization or autoclaving, having a low coefficient of friction so as to produce minimum resistance, and/or being a medical grade Class VI polymeric material. One such material is a specially formulated compound of virgin polytetrafluoroethylene and fillers (having Food and Drug Administration Master File Number MAF 288 and sold under the tradename RULON, available from Furon Dixon, 386 Metacom Ave., Bristol, R.I. 02809). This material has been found to be particularly advantageous because as the lower spindle and upper spindle rotate within the spindle supports this material does not shed or leave undesired particles in the material as it passes over the spindle pins. Conventional graphite bearings are typically unacceptable because they shed tiny black particles that discolor and/or contaminate the material being concentrated such that it can not be used for human injection.

In another embodiment, lower spindle pin 38 and upper spindle pin 40 are a shed-resistant material and the lower spindle support 28 and upper spindle support 29 are highly polished hard chrome plated 316 stainless steel or some equivalent. The supports 28, 29 should be corrosion resistant, smooth and have a very hard surface (e.g., $R_c > 60$). Other materials include, but are not limited to, TiN coated titanium or TiN coated stainless steel.

In either embodiment, it is preferable to have the semisolid or gel flow over the spindles and spindle supports so that each of these components remain relatively cool, lubricated, and there is no concern of a seal failing and exposing the semisolid or gel to undesirable contamination or discoloration by a non-shed resistant bearing. Important aspects of the present invention are the shed-resistant material used for the bearing interface, the ability to do aseptic processing for producing a human injectable product, and the ability to process semisolids or gels without clogging the system.

Rotatable body 30 is rotated by any number of means known by those of ordinary skill in the art. In the embodiment shown in FIG. 2, a magnetic drive coupling is used to rotate the rotatable body. A motor or power source (not shown) rotates the ring of magnets 42 located around the base of apparatus 10. Another magnet or set of magnets 44 are located in the base of rotatable body 30. As the ring of magnets 42 is rotated, the magnetic forces act on magnet 44 to cause the rotatable body to rotate. Preferably, the rotatable body is rotated in a range of 500 to 4000 rpm, more preferably in a range of 1000 to 3000 rpm, and most preferably at 1500 to 2000 rpm for a rotatable body diameter of 4 inches and an annular gap of 3/16 inches. Vortex flow concentration principles scale up linearly in size, therefore one of ordinary skill in the art can determine the necessary dimensions of the elements of the apparatus for the particular desired processing rate using the equations discussed above.

As the rotatable body is rotated, pump 16 pushes the material through openings 22,23 adjacent to inlet 18, over bearing interface between lower spindle 34 and lower spindle support 28, and into annular gap 46 between outer side wall 50 of rotatable body 30 and the inner side wall 52 of membrane (or filter) 48. The material is separated at the interface with the membrane into a retentate that stays in annular gap 46 and a permeate, which is primarily water, soluble molecules, and small particles, that passes through the membrane. The permeate passes into annular space 54 located between outer side wall 56 of membrane 48 and inner side wall 58 of apparatus 10. The permeate can then be drained out of the apparatus through drains 60,61. There can be one or more drains and the drains can be located anywhere along the apparatus. In one embodiment, a slight positive pressure (approximately 2 to 4 psi) can be maintained on the permeate side to prevent pulling the permeate through the membrane and prevent membrane fouling.

The Taylor vortices discussed above are created in annular gap 46. The vortices act to prevent the openings 62 in membrane 48 from becoming clogged, blinded, fouled, etc. If the vortices were not present, a gel layer would begin to develop on the inner side wall of the membrane and decrease the flux through the membrane. The vortices allow liquids and small particles to pass through the membrane while pulling the gel or larger particles back away from the membrane openings. Each vortex acts as a whirlpool pulling particles and macromolecules away from the membrane surface. The result is that the material between the rotatable body and the membrane becomes more concentrated forming a gel or semisolid while maintaining stable permeate flow rates. The gel or semisolid is circulated (or recirculated) through the apparatus over the bearing interface between upper spindle 36 and upper spindle support 29, through openings 22,33, and out through outlet 20. The gel or semisolid is recirculated through system 14 as many times as required until the desired concentration is achieved. In order to adjust the size of annular gap 46 between inner side wall 52 of membrane 48 and outer side wall 50 of rotatable body 30, membranes of different inside diameters can be used or rotatable bodies of different outside diameters can be used in the apparatus.

Lower flange member 64 is sized to create a tight friction fit with the bottom of apparatus 10 and, in one embodiment includes O-ring 70 to prevent leakage. In another embodiment, lower flange member 64 is integral with flange 66 around the base of apparatus 10. Membrane 48 is sized to create a tight friction fit with inner side wall 58 around the base of apparatus 10 and, in one embodiment includes O-ring 68 to prevent leakage. O-rings 72 and 74 can also be provided to prevent leakage around lower support 24. O-rings 76 and 78 can also be provided to prevent leakage around upper support 25. At all locations where O-rings are used, it is preferable to round off the edges of the O-ring seat so that the O-ring is not pinched when the two parts are mated. The pinching of the O-ring can result in parts of the O-ring skiving off and discoloring and/or contaminating the pharmaceutical or biological material. Preferably, the O-rings are made of medical grade elastomer.

In one embodiment, upper flange 80 around the top of membrane 48 is sized to fit between flange 82 around the top of apparatus 10 and upper flange member 84 with O-rings 86 and 88 provided to prevent leakage. Fasteners 90 are used to create a tight fit between flange 82 and upper flange 80, and between upper flange 80 and upper flange member 84. Fasteners such as shown in FIG. 2 are advantageous because the bolt is integrally attached to flange 82 and the nut simply has to be removed for disassembling, cleaning, sterilizing, servicing, etc. the apparatus. As one of ordinary skill in the art will recognize other means can be used in place of fasteners 90, such as clamps, twist-locks, threaded fittings, etc. Likewise, upper flange 80 of membrane 48 does not have to extend between upper flange member 84 and flange 82. It can fit within the inner wall of the apparatus such that upper flange member 84 and flange 82 mate face to face as is shown at the base of the membrane in FIG. 2. Upper support 25 and outlet 20 are attached to upper flange member 84 by fasteners 26. As will be recognized by one of ordinary skill in the art other fasteners can be used. Fasteners 26 are advantageous, however, because they are removable which allows for ease in cleaning and sterilization as well as repair of the inlet, apparatus, and support.

The apparatus has been described with respect to upper and lower components, however the apparatus is not limited to a vertical orientation. Because of the forces involved during operation, the apparatus can be operated horizontally or on an incline as well. In addition, the rotatable body and the membrane do not have to both be cylinders. One or both could be a cone for example.

As can best be seen in FIG. 5, lower support 24 (likewise, upper support 25) has elongated openings 22 spaced angularly around the center opening. The elongated openings are particularly advantageous because they allow the semisolid or gel to pass through more easily than smaller, circular openings. The elongated openings prevent clogging, help to decrease pressure differentials and increase the flow rate. Other configurations of enlarged openings are beneficial as well. Inlet 18 and outlet 20 are of large inner diameter and straight without any bends or elbows for the same reasons and to aid also in aseptic assembly of the apparatus. Preferably, all of the parts previously described, except for the magnets, lower spindle support, upper spindle support and the O-rings, are made from 316L stainless steel (polished to a 32 RMS finish) for ease in cleaning and sterilization, or some equivalent.

Membrane or filter 48 can be made from many different materials and have various pore sizes. The membranes can be described as permeable or semi-permeable. Stainless steel membranes ranging from those manufactured from sintered steel powder with a pore rating of 0.2 μm up to those manufactured from sintered steel powder or steel fibers with 1, 3, 5, 10, 20, 50 and 100 μm pore ratings can be used. Stainless steel screens with pore sizes of 20 to 200 μm can also be used. The advantage of steel membranes is that they can be cleaned with a wide array of agents, including caustics, and they can withstand exposure to repeated steam sterilization cycles. Hydrophilic polymeric ultrafilters and microfilters made from polysulfone or a cross-linked polyacrylonitrile polymer in pore sizes ranging from 10 kD to 0.2 μm can also be used. The preferred membrane pore size is dependent on the particle or fiber size of the material to be concentrated. In the case of collagen 0.2 μm to 5 μm is preferred, more preferably 1 μm to 3 μm.

The foregoing has described the principles, preferred embodiments and modes of operation of the present invention. However, the invention should not be construed as being limited to the particular embodiments discussed. For example, filtration systems using a membrane mounted on an inner body which rotates within a stationary body as disclosed in U.S. Pat. Nos. 4,790,942, 4,876,013, and 4,911,847 issued to Shmidt et al., which are incorporated herein by reference in their entirety, are within the scope of the claimed invention. As are systems that use counter-rotating membranes and solid bodies or counter-rotating membranes alone. Thus, the above-described embodiments should be regarded as illustrative rather than restrictive, and it should be appreciated that variations may be made other than those discussed by workers of ordinary skill in the art without departing from the scope of the present invention as defined by the following claims.

The invention claimed is:

1. An apparatus having a permeable or semi-permeable membrane for aseptic vortex flow concentration of a dispersion, comprising:

a rotatable body having an outer side wall, an upper spindle, and a lower spindle;

an outer body having an upper end with openings therein, a lower end with openings therein, and an inner side wall spaced from the outer side wall of the rotatable body to define an annular space for receiving the permeable or semi-permeable membrane;

an upper spindle support of shed-resistant medical grade USP material in the upper end of the outer body for receiving the upper spindle for producing a shed-resistant interface;

a lower spindle support of shed-resistant medical grade USP material in the lower end of the outer body for receiving the lower spindle for producing a shed-resistant interface; and means for rotating the rotatable body about an axis through the upper spindle and the lower spindle at a rate sufficient to produce Taylor vortices in an annular gap between the outer side wall of the rotatable body and the permeable or semi-permeable membrane;

said upper spindle support being located adjacent to the openings in the upper end and the lower spindle support being located adjacent to the openings in the lower end such that the dispersion passes through the openings and lubricates the upper spindle support and the lower spindle support.

2. The apparatus of claim 1 wherein the shed-resistant upper spindle support and the shed-resistant lower spindle support are bushings which remain dimensionally stable after steam sterilization.

3. The apparatus of claim 1 wherein the means for rotating the rotatable body is a magnetic drive system.

4. The apparatus of claim 1 wherein the dispersion enters the annular gap through the openings in the lower end and the concentrated dispersion exits through the openings in the upper end.

5. The apparatus of claim 1 wherein the openings in the lower end and the upper end are elongated to prevent clogging by the concentrated dispersion.

6. An apparatus having a filter for aseptic vortex flow concentration of a dispersion comprising:

a housing having an upper end with an outlet therein, a lower end with an inlet therein, an inner side wall, an upper rotor support in the upper end of the housing, and a lower rotor support in the lower end of the housing;

a rotor having a medical grade USP material upper shed-resistant member and a medical grade USP material lower shed-resistant member rotatably received in the upper rotor support and the lower rotor support, the rotor having an outer side wall spaced from the inner side wall of the housing to define an annular space for receiving the filter; and means for rotating the rotor about an axis through the center of the rotor at a rate sufficient to produce Taylor vortices in an annular gap between the outer side wall of the rotor and the filter;

said upper rotor support being located adjacent to the outlet in the upper end and the lower rotor support being located adjacent to the inlet in the lower end such that the dispersion passes over the upper shed-resistant member and the lower shed-resistant member.

7. The apparatus of claim 6 wherein the upper shed-resistant member and lower shed-resistant member are spindles which remain dimensionally stable after steam sterilization.

8. The apparatus of claim 6 wherein the means for rotating the rotor is a magnetic drive system.

* * * * *